United States Patent [19]

Johnson et al.

[11] 4,440,290

[45] Apr. 3, 1984

[54] RECEPTACLE FORMING APPARATUS HAVING SPLIT RECEIVER

[75] Inventors: Warren E. Johnson; Andrzej Maliszewski, both of Bristol, Conn.

[73] Assignee: Sherwood Tool, Incorporated, Kensington, Conn.

[21] Appl. No.: 250,226

[22] Filed: Apr. 2, 1981

[51] Int. Cl.³ .............................................. B65G 47/86
[52] U.S. Cl. ..................................... 198/479; 198/696
[58] Field of Search ............... 198/479, 695, 696, 484, 198/653

[56] References Cited

U.S. PATENT DOCUMENTS

| 1,218,315 | 3/1917 | Redd | 198/696 |
| 1,242,817 | 10/1917 | Lally | 198/479 |
| 2,687,202 | 8/1954 | Nordquist et al. | 198/484 |
| 4,327,616 | 5/1982 | Klukis | 198/479 |

*Primary Examiner*—Robert J. Spar
*Assistant Examiner*—Jonathan D. Holmes
*Attorney, Agent, or Firm*—McCormick, Paulding & Huber

[57] ABSTRACT

A split receiver mounted on an indexible rotary turret of a paper receptacle forming machine has a cylindrical bore which opens radially outwardly of the turret. One part of the receiver, mounted in fixed position on the turret, defines the inner end portion of the bore. Another part, supported for movement into and out of mating engagement with the one part cooperates with the outer end portion of the one part to define the outer end portion of the bore. A camming mechanism operates in response to indexing movement of the turret to move the one part out of mating engagement with the other part and from a receptacle holding position to a receptacle releasing position.

11 Claims, 3 Drawing Figures

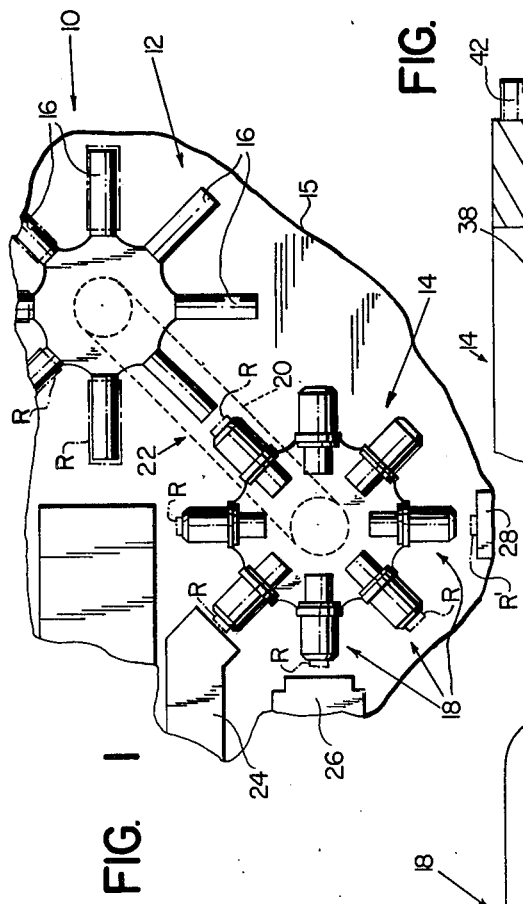
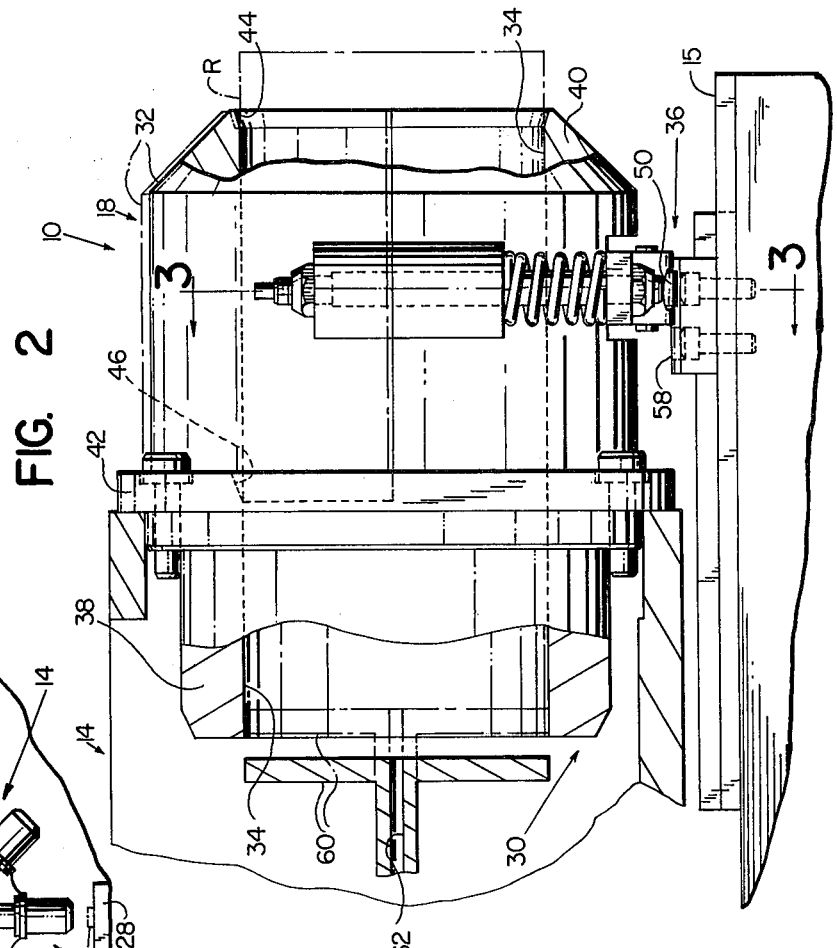
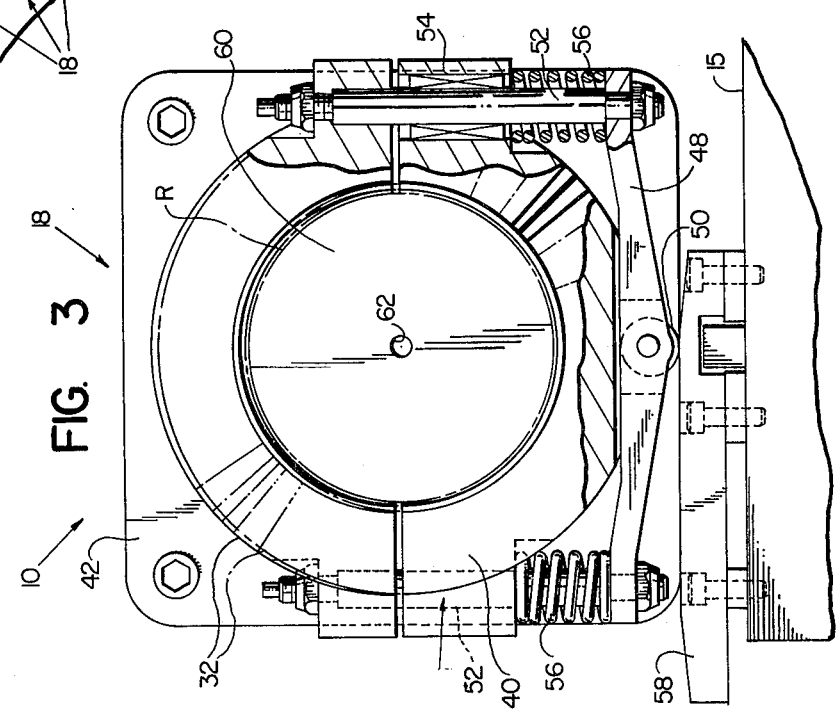

RECEPTACLE FORMING APPARATUS HAVING SPLIT RECEIVER

BACKGROUND OF THE INVENTION

This invention relates in general to paper receptacle forming apparatus and deals more particularly with a turret type machine which has improved receptacle receivers for releasably holding formed receptacle bodies. In such a machine the receivers are mounted on a turret and are operative to successively present receptacle bodies at one or more work stations where additional forming operations are performed. Pressure applied initially to a receptacle body, when it is inserted into an associated receiver, and during subsequent forming operations, while it is held by the receiver, tends to cause the receptacle body to tenaciously adhere to the wall of the receiver, which presents problems in accurately positioning the receptacle within and in ejecting the finished receptacle from its receiver. These problems prove particularly troublesome in the manufacture of a straight walled container, that is a container which has a substantially uniform cross section throughout its axial height, or in the manufacture of a frusto-conical container which has a relatively slight taper.

Heretofore receivers have been provided which open for releasing receptacles to facilitate ejection. Such receivers generally comprise longitudinal sections hingedly connected along the length thereof for pivotal movement into and out of mating engagement, between receptacle holding and releasing positions. Such a receiver is illustrated and described in U.S. Pat. No. 1,813,379 to Berg for APPARATUS FOR MAKING RECEPTACLES, issued July 7, 1931. While a receiver of the aforedescribed type facilitates release of a receptacle, the use of air in conjunction with the receiver to eject the receptacle tends to be highly inefficient. This inefficiency results from the receiver being in its releasing or open position while the air blast is applied to eject the receptacle. Further, such a receiver does not accurately control the direction of receptacle ejection. The present invention is primarily concerned with these problems.

SUMMARY OF THE INVENTION

A receptacle forming apparatus embodying the present invention includes a rotatable turret and a receptacle receiver assembly which has one part mounted in fixed position on the turret and another part supported for movement relative to the one part between receptacle holding and releasing positions. The one and the other part cooperate in mating engagement to define a radially outwardly opening receptacle receiving bore which has a wall adapted for substantial complementary engagement with the wall of a receptacle body received therein. A cam disposed at a predetermined location about the periphery of the turret is coengageable with means associated with the receiver assembly for moving the other part to its receptacle releasing position. In accordance with the invention, the one part defines the inner end portion of the bore and the other part cooperates with the outer end portion of the one part to define the outer end portion of the bore.

BRIEF DESCRIPTION OF THE DRAWING

FIG. 1 is a somewhat schematic fragmentary plan view of a double turret receptacle forming machine embodying the present invention.

FIG. 2 is a fragmentary side elevational view of the machine of FIG. 1 and illustrates one of the receptacle receivers, the receiver being shown partially in longitudinal section.

FIG. 3 is a fragmentary front elevational view showing the receiver of FIG. 2 in partial section taken along the line 3—3 of FIG. 2.

DETAILED DESCRIPTION OF PREFERRED EMBODIMENT

Referring now to the drawing, an apparatus for forming a receptacle and embodying the present invention is indicated generally by the reference numeral 10. The apparatus 10 is a double turret cup forming machine adapted to form a straight walled receptacle, that is a receptacle which has a substantially uniform cross section throughout its axial height. The machine 10 has two generally horizontally disposed turrets indicated generally at 12 and 14 and supported on a frame 15 for rotation about vertical axes. The turret 12 carries eight radially outwardly extending mandrels 16, 16 upon which the bodies of paper receptacles are formed at associated work stations disposed about the periphery of the turret. The turret 14 carries eight radially outwardly opening split receiver assemblies indicated generally at 18, 18. The turrets 12 and 14 are driven in timed relation to each other by a timing belt 20 so that each successive receiver assembly 18 is presented to an associated mandrel 16 at a transfer station indicated generally at 22 in FIG. 1.

At the transfer station 22 a cup-shaped receptacle body, having side and bottom walls and indicated by the letter R, is transferred from a mandrel 16 into an associated receiver assembly 18, in a manner well known in the art. The receiver assembly 18 with the receptacle body R positioned therein is next indexed to a seating station 24 where the receptacle body is accurately seated within the receiver assembly. It is then indexed to a die curling or top beading station 26 where a bead (not shown) is formed or rolled on the top edge of the receptacle body R. The finished receptacle R' carried by its associated receiver assembly 18 is ultimately indexed to a discharge station 28 where it is ejected from its receiver assembly 18 into a discharge conduit by an air jet, as will be hereinafter further discussed. A typical double turret paper cup making machine of the type hereinbefore described is illustrated and described in somewhat more detail in U.S. Pat. No. 3,289,552 to Corazzo, assigned to the assignee of the present invention, and hereby adopted by reference as part of the present disclosure.

A typical split receiver assembly 18, shown in FIGS. 2 and 3, comprises a pair of separable parts which include one part or section, indicated generally at 30, and another part or section 32, which cooperates with the section 30 to define a bore 34 for receiving and holding an associated receptacle body R shown in phantom in FIG. 2. The receiver assembly 18 further includes a camming mechanism for moving the part 32 relative to the part 30 from a receptacle retaining position, shown in full lines in FIG. 2 and broken lines in FIG. 3, to a receptacle releasing position indicated by broken lines in FIG. 2 and full lines in FIG. 3, in response to indexing movement of the turret 14, as will be hereinafter further discussed.

The illustrated receiver assembly 18 is particularly adapted to receive and hold a generally cylindrical straight walled receptacle, consequently the bore 34 is generally cylindrical to substantially complement the cylindrical receptacle body R. The part 30 is mounted in fixed position on the turret 14 and has a generally cylindrical inner end portion 38 which defines the inner end portion of the bore 34. The part 30 further includes an outer end portion 40 which defines an associated lower semi-cylindrical part of the bore outer end portion. An integral annular flange 42 projects radially outwardly from the part 30 between the inner and outer end portions 38 and 40 and receives fasteners which secure the receiver assembly 18 in fixed position on the turret 14. The movable part 32 comprises a generally semi-cylindrical part which cooperates in mating engagement with the outer end portion 40 to define the outer end portion of the bore 34. Specifically, the part 32 defines an upper semi-cylindrical part of the bore outer end portion.

It should be noted that the radial inner end portion of the bore 34, that is the portion defined by the cylindrical inner end portion 38 has a diameter slightly greater than the diameter of the outer end portion of the bore, that is the portion defined by the movable section 32 and the outer end portion 40. An annular chamfer 44 formed on the part 32 and the portion 40 at the open outer end of the bore 34 aids in guiding a receptacle R into the bore. A semiannular chamfer 46 associated with the upper half of the bore 34 is formed within the flange 42 intermediate the inner and outer end portions of the bore, for a purpose which will be hereinafter further evident.

The camming mechanism 36 for opening the receiver assembly 18 comprises a yoke 48 disposed below the outer end portion 40. A roller follower 50 is mounted on the yoke intermediate its ends for rotation about an axis parallel to the axis of the bore 34. A pair of operating or lifting rods 52, 52 fastened to opposite ends of the yoke extend upwardly through bushings 54, 54 (one shown) mounted within bosses which project from opposite sides of the stationary section 30. The upper ends of the lifting rods 52, 52 are fastened to bosses on the movable section 32. Compression springs 56, 56 which surround the lifting rods 52, 52 act between the yoke 48 and the section 30 to bias the yoke downwardly whereby to urge the movable section 32 toward its receptacle retaining position wherein it is in mating engagement with the associated outer end portion 40.

The cam mechanism 36 further includes a stationary cam 58 which is mounted in fixed position on the frame 15 at the transfer station 22. Additional cams are mounted at other machine stations, as will be hereinafter discussed.

The machine 10 also has a discharge plunger 60 mounted on the turret 14 for axial movement into and out of the inner end portion of the bore 34, as best shown in FIG. 2. The plunger 60 has a central air passageway 62 for communicating with the bore 34 and which is connected to a source of air under pressure. Suitable valve means (not shown) is provided for controlling air flow from the source to and through the passageway 62 for use in ejecting a receptacle from the bore 34.

As the illustrated receiver assembly 18 indexes into position at the transfer station 22 the roller follower 50 engages the lefthand end of the cam 58, as it appears in FIG. 3, which causes the lifting rods 52, 52 to elevate the movable part 32. When the receiver reaches its on station position, as it appears in FIG. 3, the camming mechanism 36 holds the movable part 32 in its elevated or receptacle releasing position relative to the stationary part 30, and the discharge plunger 60 moves into the inner end of the bore 34. The outer end of the bore 34 is substantially coaxially aligned with the outer end of an associated mandrel 16 on the turret 12 which carries a formed receptacle body R. The receptacle body R is ejected from the mandrel 16 by a jet of air or other suitable ejection means and moves from the mandrel into the open receiver assembly 18. The chamfer 44 aids in guiding the receptacle body R into the receiver assembly bore. The lower part of the bore 34 is substantially semi-cylindrical throughout its length, however, when the part 32 is in its open or receptacle receiving position the upper part of the bore defined by the part 32 is slightly out of alignment with the corresponding part of the bore defined by the inner end portion 38. It is for this reason that the chamfer 46 is provided. The chamfer forms a smooth transition between the upper inner and outer end portions of the upper part of the bore 34.

The inner end portion of the bore 34 is of a slightly larger diameter then the receptacle body R so that the receptacle body moves freely into the open receiver assembly 18. The plunger 16 serves as a stop to limit travel of the receptacle body R into the bore 34 during loading of the receiver assembly 18.

When the receptacle body R is fully inserted into the bore 34 the discharge plunger 60 is withdrawn and the turret 14 indexes the receiver assembly 18 to an off station position so that the roller 50 moves out of engagement with the cam 58. The section 32 then moves to its closed or receptacle retaining position under the biasing force of the springs 56, 56. The receptacle body R is held in clamped position within the bore 30 until the turret 14 indexes the receiver assembly to an on station position at the seating station 24. At the latter station another cam, similar to the cam 58, cooperates with the roller follower 50 to open the receiver assembly 18. A mechanism (not shown) located at the station 24 operates to accurately seat the receptacle body R within the receiver 18. The receptacle body R is thereafter held in fixed position within the receiver assembly 18 while it is presented at one or more work stations, such as the work station 26, where a bead is rolled on the extending edge portion of the receptacle R.

The receptacle body R is held in fixed position within the receiver assembly 18 until the receiver assembly is ultimately indexed to the discharge station 28. A cam at the latter station, similar to the cam 58, cooperates with the roller follower 50 to cam the part 32 to its open or receptacle releasing position. When the receiver 18 attains its on station position at the discharge station 28, the discharge plunger 60 moves into the bore 34 to engage the bottom of the finished receptacle R' and move it slightly outwardly relative to the receiver assembly 18. The valve means associated with the air passageway 62 then operates to admit air under pressure into the passageway so that a jet of air impinges upon the central portion of the receptacle bottom wall whereby to eject the receptacle from the receiver assembly 18. Since the inner end portion of the bore 34, is substantially concentric with the wall of the receptacle R', the inner end portion of the bore maintains the receptacle for movement along a substantially axial path as it leaves the receiver assembly 18. Thus, the inner portion 38 accurately controls the direction of movement of the receptacle R' as it is ejected from the receiver assembly, so that it may be transferred from the receiver assembly to another mandrel, if desired. Further, since the rear portion 38 does not open, the air ejected from the passageway is efficiently utilized to effect ejection of the receptacle R' from the split receiver assembly 18.

We claim:

1. In an apparatus for forming a receptacle and comprising a rotatable turret, a receptacle receiver assembly having one part mounted in fixed position on the turret and another part supported for movement relative to the one part between receptacle holding and releasing positions, the one and the other part cooperating to define a radially outwardly opening receptacle receiving bore, a cam disposed at a predetermined location about the periphery of the turret, and cam engaging means associated with the receiver for moving the other part to its receptacle releasing position, the improvement wherein said one part defines the inner end portion of said bore, said other part cooperates with the outer end portion of said one part to define the outer end portion of said bore, and said cam engaging means comprises a yoke disposed below the outer end portion of said one part, a roller follower journalled on said yoke, and operating means including rods extending through said one part, each of said rods having one end connected to said yoke and its opposite end connected to said other part for moving said other part away from said one part in response to engagement of said roller follower with said cam.

2. In an apparatus for forming a receptacle as set forth in claim 1 the further improvement wherein said outer end portion of said one part defines one half of said bore outer end portion and said other part defines the other half of said bore outer end portion.

3. In an apparatus for forming a receptacle as set forth in either claim 1 or claim 2 wherein said bore includes a semiannular chamfered portion intermediate said bore inner end portion and said bore outer end portion.

4. In an apparatus for forming a receptacle as set forth in claim 3 wherein said bore includes an annular chamfered portion at its outer end defined by said outer end portion of said one part and said other part.

5. In an apparatus for forming a receptacle as set forth in either claim 1 or claim 2 the further improvement wherein said bore is generally cylindrical.

6. In an apparatus for forming a receptacle as set forth in claim 5 the further improvement wherein said bore inner end portion has a diameter slightly greater than the diameter of said bore outer end portion.

7. In an apparatus for forming a receptacle as set forth in claim 1 wherein said apparatus includes means for normally biasing said other part toward its receptacle holding position the further improvement wherein said biasing means comprises springs surrounding said operating rods and acting between said one part and said yoke.

8. In an apparatus for forming a receptacle as set forth in claim 7 the further improvement wherein said yoke is disposed below said one part and each of said operating rods has a lower end portion connected to an associated end of said yoke and an upper end portion connected to said other part.

9. In an apparatus for forming a receptacle and comprising a rotatable turret, a receptacle receiver assembly having one part mounted in fixed position on the turret and another part supported for movement relative to the one part between receptacle holding and releasing positions, the one and the other part cooperating in mating engagement to define a radially outwardly opening receptacle receiving bore, means for biasing said other part toward its receptacle holding position, a cam disposed at a predetermined location about the periphery of said turret, and cam engaging means associated with the receiver for moving the other part to its receptacle releasing position, the improvement wherein the bore is generally cylindrical, said one part defines the inner end portion of said bore, said other part cooperates with the outer end portion of said one part to define the outer end portion of said bore, said bore includes a semiannular chamfered portion intermediate said bore inner and outer end portions and said bore, said inner end portion has a diameter slightly greater than the diameter of said bore outer end portion, and said cam engaging means comprises a yoke disposed below the outer end portion of said one part, a roller follower journalled on said yoke, and operating rods extending through said one part, each of said rods having one end connected to said yoke and its opposite end connected to said other part for moving said other part away from said one part and toward its receptacle releasing position in response to engagement of said roller follower with said cam.

10. In an apparatus for forming a receptacle as set forth in claim 9 the further improvement wherein said biasing means comprises springs carried by said operating rods and acting between said yoke and said one part.

11. In an apparatus as set forth in either claim 1 or claim 9, the further improvement wherein said bore extends through said receptacle receiver assembly and said apparatus includes a plunger carried by said turret and movable into and out of the inner end of said bore.

* * * * *